United States Patent [19]

Kinne et al.

[11] 3,846,525

[45] Nov. 5, 1974

[54] METHOD FOR MANUFACTURING FOAM SANDWICH PANELS

[75] Inventors: Frank E. Kinne, Eloy; Phil D. Carmack, Casa Grande, both of Ariz.

[73] Assignee: Permatank Engineering & Mfg. Co., Inc., Eloy, Ariz.

[22] Filed: Aug. 25, 1971

[21] Appl. No.: 174,806

[52] U.S. Cl............ 264/46.5 D, 161/126, 161/161, 249/95, 249/167, 249/172, 264/54, 264/261, 264/338, 264/263, 425/123, 425/817
[51] Int. Cl.......................... B29c 5/08, B29d 27/04
[58] Field of Search......... 264/45, 47, 54, 261, 263, 264/272; 249/170, 171, 172; 52/309

[56] References Cited
UNITED STATES PATENTS

| | | | |
|---|---|---|---|
| 2,084,113 | 6/1937 | Sherts | 264/261 |
| 2,091,615 | 8/1937 | Rohm et al. | 264/261 |
| 3,013,370 | 12/1961 | Vida | 264/261 UX |
| 3,229,441 | 1/1966 | Heffner | 264/45 X |
| 3,257,484 | 6/1966 | Barnette | 264/45 X |
| 3,328,836 | 7/1967 | Axelsson | 264/45 X |
| 3,630,819 | 12/1971 | Conger | 264/45 X |

OTHER PUBLICATIONS
Rubber and Plastics Age, "Foamed Cored Panels For Transport," Vol. 44, No. 5, May 1963, pp. 499–500, (Cellular Polymers).

*Primary Examiner*—Philip E. Anderson
*Attorney, Agent, or Firm*—Drummond, Nelson & Anderson

[57] ABSTRACT

In order to provide rapid production of foam sandwich panels of the type utilized in building structures, an upright open top press, which clasps semi-rigid outer panels in spaced relationship, is filled with a quick rising foam by injecting the foam in repetitive horizontal layers using a specially configured gun. The press consists of three essential sections: the two outer members which contain the panel being prepared in the proper configuration without bulges, and a central, removable member which functions to define the bottom and ends of the foam injected between the semi-rigid panels. One of the outer members is mounted on rails to permit ready set up and withdrawal of the press and completed panels. The two outer members of the press are held together during the panel-forming operation by a plurality of snap-over clamps spaced about the periphery.

1 Claim, 7 Drawing Figures

PATENTED NOV 5 1974

INVENTOR.
PHIL D. CARMACK
FRANK E. KINNE
BY
William H. Drummond
ATTORNEY

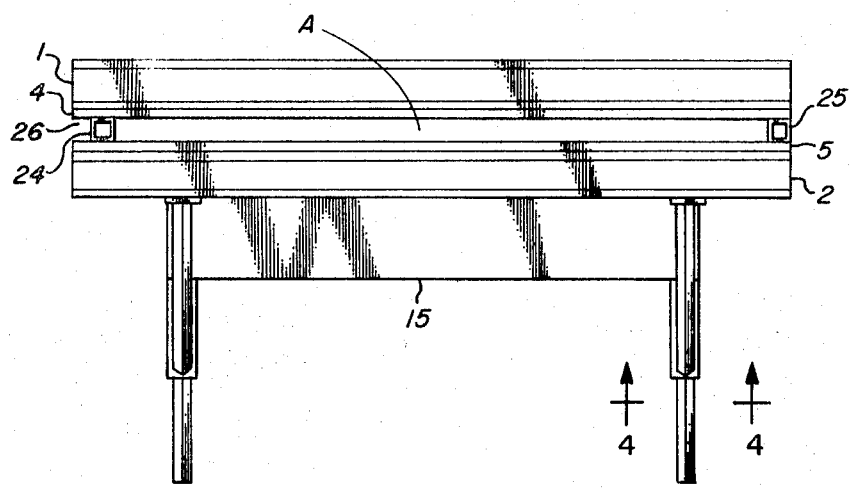
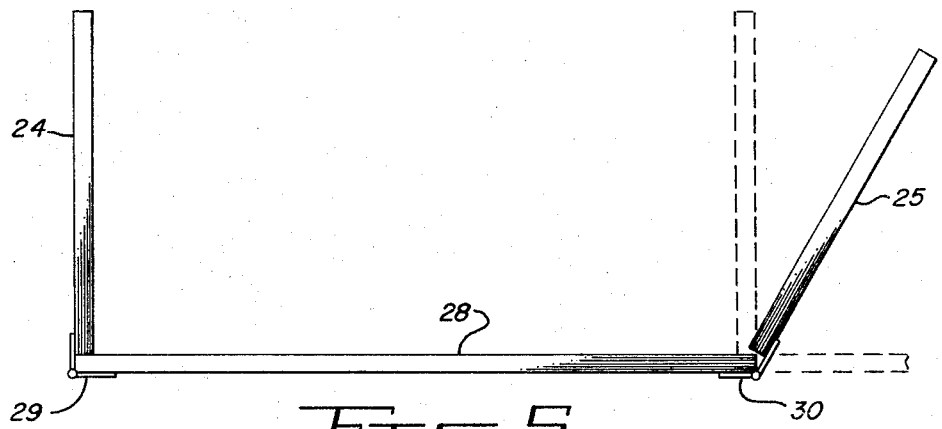
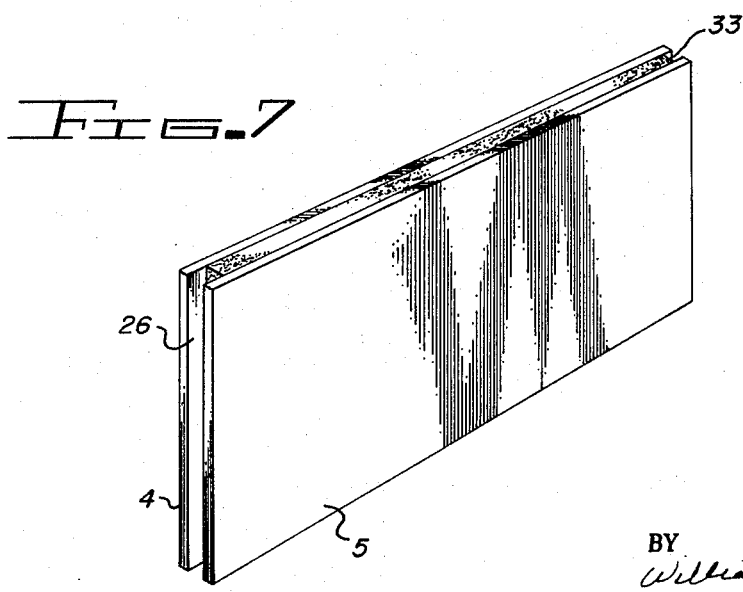
INVENTOR.
PHIL D. CARMACK
FRANK E. KINNE
BY William H. Drummond
ATTORNEY

METHOD FOR MANUFACTURING FOAM SANDWICH PANELS

This invention relates to the building materials arts and, more particularly, to a method for making a foam sandwich panel and to apparatus for practicing the method.

Modern building construction techniques have been increasingly directed to means for decreasing the utilization of labor to provide a corresponding reduction in building costs. Thus, the use of prefabrication techniques has become common place and many aspects of prefabrication are practiced in the building arts.

One prefabricated building element which has come into wide use is the so-called foam sandwich panel which consists of a pair of spaced-apart, parallel semi-rigid sheets with the volume between the sheets filled with a foam such as polyurethane. These foam panels are prepared in various standard sizes and configurations for utilization as "building blocks" in the formation of large wall panel areas. The foam sandwich panels are characterized by tremendous strength and fine insulating qualities and are relatively lightweight and easy to handle. However, the prior art methods and apparatus for preparing the individual sandwich panels has been slow and cumbersome and required very expensive and elaborate equipment. Broadly, the prior art method of preparing foam sandwich panels has required the utilization of reinforced steel presses capable of withstanding enormous pressures which are developed during the prior art fabrication techniques.

Briefly, in the prior art, the two semi-rigid panels are fixed in spaced-apart relationship within the press and a liquid mixture of polyurethane components and catalyst are poured into the space between the panels. During the expansion and curing time, which is on the order of 30 minutes or more per panel, the panel remains in the press which is subjected to pressures in the range of 20,000 - 30,000 psi. Because of the strength required of the press, it is very cumbersome to operate and requires a good deal of power equipment The term "semi-rigid sheets," as previously noted herein and as will be hereinafter referenced in connection with the detailed description of the preferred embodiment of the present invention, is defined as any suitable construction panel. As will be readily understood by those skilled in the art, construction panels include, but are not limited to, such commercially available materials as sheets of plywood, wall board, aluminum, composition board, and similar substitutive expediences.

In view of the broad acceptance of foam sandwich panels in the building arts, it will be apparent to those skilled in the art that it would be highly desirable to provide a method and apparatus for fabricating such panels substantially faster and with much simpler equipment.

Thus, it is a broad object of our invention to provide an improved method for preparing foam sandwich panels.

In another aspect, it is a broad object of our invention to provide improved apparatus for practicing the method.

It is another object of our invention to provide a method for preparing foam sandwich panels which does not require structures fabricated to withstand the tremendous pressures encountered in practicing the prior art techniques during the fabrication process.

It is a further object of our invention to provide a method and apparatus for fabricating foam sandwich panels quickly and with relatively simple tooling.

The subject matter of the invention is particularly pointed out and distinctly claimed in the concluding portion of the specification. The invention, however, both as to organization and method of operation, may best be understood by reference to the following description taken in connection with the accompanying drawing of which:

FIG. 3 is a top view of the press apparatus illustrated in FIG. 1;

FIG. 5 is a side view of the hinged intermediate member which is utilized to partially define the cavity into which the foaming material is injected;

FIG. 7 is a perspective view of an exemplary foam sandwich panel produced according to the method and with the apparatus of the present invention.

Figure 1:
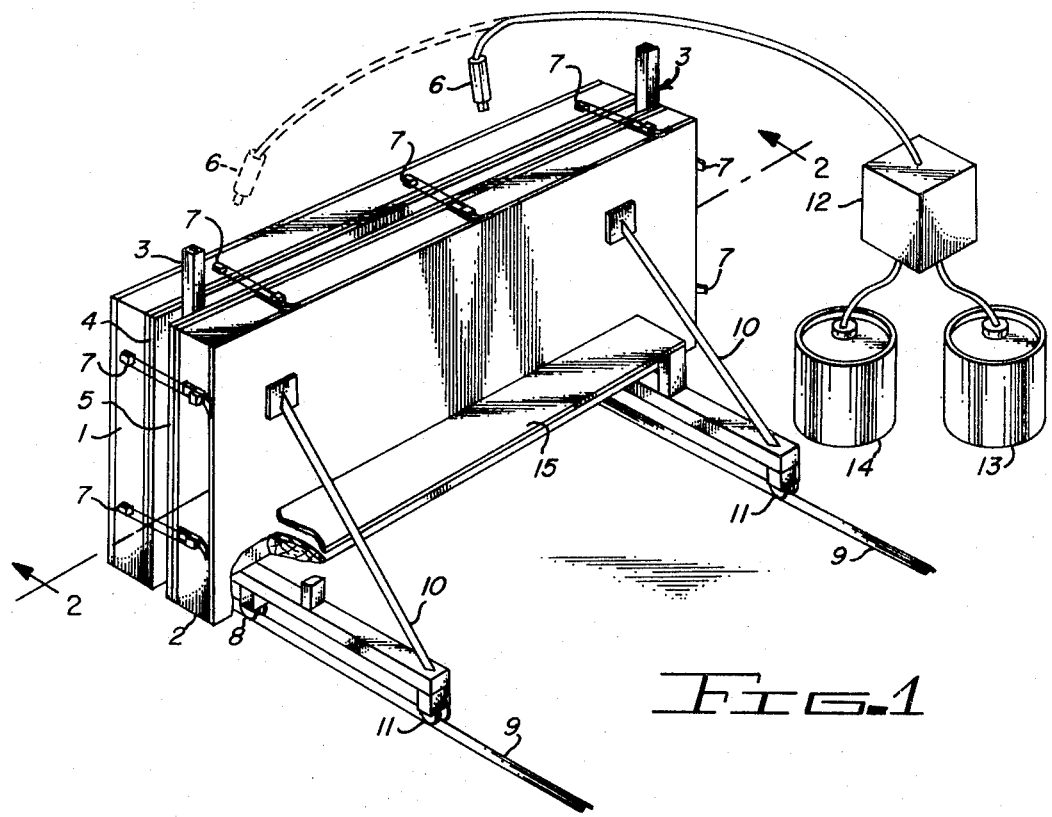
FIG. 1 is a perspective view of an upright press according to the present invention with a representation of the method by which the foam is distributed between the semi-rigid panels.

Attention is now directed to FIG. 1 which depicts the upright press outer members 1 and 2 held in spaced-apart relationship by the hinged intermediate member 3 while a foam sandwich panel is being prepared. As will become more readily apparent while the description proceeds, the foam and sandwich panel consists of outer semi-rigid sheets 4 and 5 and polyurethane foam injected from the gun 6 into the cavity defined by the hinged intermediate member 3 and the inner surfaces of the semi-rigid sheets 4 and 5. During the fabrication process, the press members are clamped tightly together by the several snap-over clamps 7 distributed about the sides and tops of the press outer members 1 and 2.

In the exemplary apparatus illustrated in FIG. 1, the press outer member 1 is stationary. However, the press outer member 2 is supported by casters 8 which ride on inverted V rails 9, and the press outer member 2 is further stabilized by angle iron braces 10 which extend from the upper portion of the outer surface of the press outer member 2 to outboard casters 11 which also ride on the rails 9. Thus, it will be apparent that if the snap-over clamps 7 are all unfastened, the press outer member 2 may be rolled away from the press outer member 1 to provide access to the space therebetween in order to set up the press or to remove the finished product.

By the method which will be described in further detail below, the gun 6 is directed in a series of horizontal sweeps along the length of the press to fill the space defined by the hinged intermediate member 3 and the outer semi-rigid sheets 4 and 5 with successive layers of foam. The gun 6 receives the components for forming the activated liquid foam from a formulator 12 which delivers foam solution and catalyst from separate tanks 13 and 14 at a pressure in the range, for example, of 2,000 - 3,000 psi. A standard formulator which has been found to be satisfactory for the intended purpose is that manufactured under the tradename Binks C.

In order to facilitate manual use of the gun 6 in the simplest configuration of the apparatus according to the invention, a platform 15 is provided on the lower portion of the outer surface of the press outer member 2 for a gun operator to stand upon. It is, of course, within the purview of the invention to provide simple mechanical means for achieving the repetitive passes of the gun 6.

Figure 2:
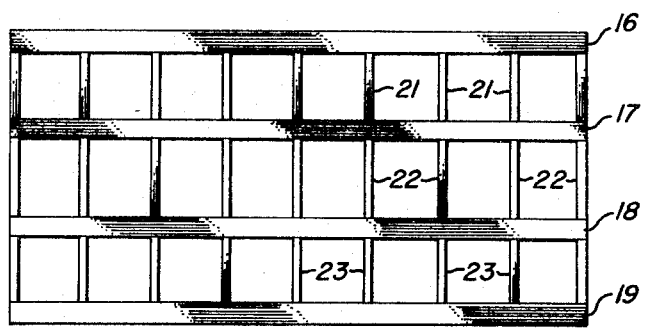
FIG. 2 is a side view of an upright press member with the outer sheet member removed therefrom, to illustrate exemplary internal structure of the press panels.

While the press outer members 1 and 2 need not have the strength of the prior art presses when the method of the present invention is used, they must nonetheless have considerable rigidity to prevent bulging during the panel fabrication process. FIG. 2, which is a cross-section of a press outer upright member, illustrates an internal structure for the press outer members which has been found satisfactory in practice. First, second, third and fourth 4 × 4 beams, 16, 17, 18, and 19, extend horizontally and are separated by vertical 2 × 4 beam groups 21, 22 and 23. The 2 × 4 beams in the group 21 are sufficiently long to make the dimension from the upper edge of the 4 × 4 beam 16 to the center of the 4 × 4 beam 17 approximately 16 inches. Similarly, the 2 × 4 beams in the group 22 are dimensioned to make the center distance between the 4 × 4 beams 17 and 18 approximately 16 inches, and the 2 × 4 beams in the group 23 are cut to make the center distance between the center of the beam 18 and the lower edge of the beam 19 approximately 16 inches for a total height approximating 4 feet. The length of the 4 × 4 beams is approximately 8 feet, and the 2 × 4 beams are distributed on approximately 12 inch centers, except for the end beams which are measured to the edge, to achieve the necessary structural rigidity. The framework of 4 × 4 and 2 × 4 beams is overlayed on both sides with one or more sheet members, preferably ¾ inch plywood, which serves to distribute localized pressures developed during the fabrication process.

FIG. 3 is a top view of the press apparatus shown in FIG. 1 illustrating the manner in which the hinged intermediate member 3 defines a cavity A between the outer semi-rigid sheets 4 and 5 from which a foam panel is to be fabricated. It will be observed that the leftmost vertical side member 24 of the hinged intermediate member 3 is somewhat inset, as opposed to the position of the right vertical side member 25 to define an area 26 in which no foam will be disposed between the outer semi-rigid sheets 4 and 5. The reason for this disposition of the vertical side members 24 and 25 of the hinged intermediate member 3, which disposition is optional, will become apparent from a description of the completed foam sandwich panel below.

Figures 4, 6:
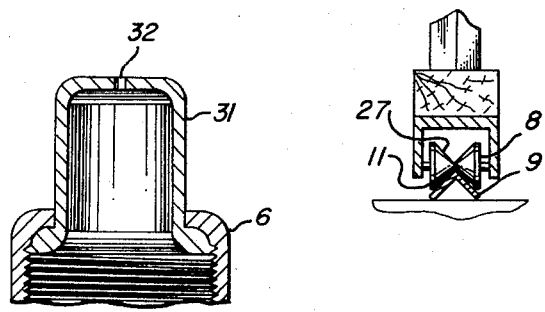
FIG. 4 is a fragmentary view taken along the line 4—4 of FIG. 3 to illustrate an exemplary configuration for casters and corresponding rails upon which a part of the press may be rolled forward and backward to facilitate set-up and removal of the finished product.
FIG. 6 is a partial cross-sectional view illustrating a particular orifice configuration for the gun utilized in injecting the foaming material into the cavity.

FIG. 4 illustrates one presently preferred form for the casters 8, 11 which ride on the inverted V rails 9. Inasmuch as the inverted V rails 9 present a 90° angle on which the casters 8, 11 ride, it will be apparent that the circumferential portion 27 is preferably cut at a corresponding angle to provide maximum stability and accurate alignment of the press outer members 1 and 2 as the press outer member 2 is repeatedly rolled back and forth during set up and during removal of the finished product.

FIG. 5 illustrates the hinged intermediate member 3 which is observed to consist of a left vertical side member 24, a right vertical side member 25, and a base member 28, each of which may consist of, in an exemplary embodiment of the apparatus, 1½ inch square steel tubing. Each of the vertical side members 24 and 25 are fixed, for example by hinges, to the base member 28 by hinges 29 and 30, respectively. Thus, the vertical side members 24 and 25 may be pivoted between fully vertical positions to fully horizontal positions to facilitate removing the finished foam sandwich panel in the manner described below.

As previously stated, in conjunction with the description of FIG. 1, the foam material is injected in repetitive horizontal layers using the gun 6. By way of example, the gun 6 may be a standard Binks mixing head modified, however, to the configuration illustrated in FIG. 6. It has been found very desirable, in practicing the method of the present invention, to issue a narrow, nondiverging stream from the gun. To realize such a stream, a gun fixture 31 is utilized in place of the standard Binks fixture in the gun 6 and is provided with a straight orifice 32 which may be on the order of 1/16 inch and, preferably, not more than 5/64 inch in diameter.

In accordance with the method of the present invention as utilized, for example, with the exemplaray press structure described above, the hinged intermediate member 3 is first waxed to permit ready removal of the finished panel from the press when the fabrication cycle is completed. Referring to FIG. 1, the outer semi-rigid sheet 4 is placed into position against the inner surface of the press outer member 1, the hinged intermediate member 3 is positioned generally as shown in FIG. 1 with the vertical side members 24 and 25, FIG. 5, in the upright position, and the outer semi-rigid sheet 5, FIG. 1, is positioned against the inner surface of the press outer member 2. The press outer member 2 is then rolled on the inverted V rails 9 to bring the outer semi-rigid sheet 5 into contact with the hinged intermediate member 3, in which position the several snap-over clamps 7 may be locked to pull the outer semi-rigid sheets 4 and 5 tightly against the hinged intermediate member 3. The operator may then, from the platform 15, manually direct a series of horizontal passes with the gun 6 to inject a narrow stream of fast-rising foam in repetitive horizontal layers to build up the intermediate form layer in the cavity A, FIG. 3. It has been found that a foam and catalyst combination providing an initiation time of 4–5 seconds and a full rising time of approximately 10 seconds achieves excellent results when the mixture is injected from the gun 6 in one direction only. That is, the mixture may be injected while the gun 6 is moved from left to right, but the stream should be cut off as the gun is returned from the right side of the press to the left to commence the next inject cycle. With this procedure, properly timed, the foam mixture will have expanded fully before new foam is injected over it. The fact that the horizontal passes of the gun 6 may be simply and readily mechanized will be obvious to those skilled in the mechanical arts. It has been found desirable to control the mixture component temperatures within the range of 100°–115°F to achieve consistent results.

The horizontal passes with the gun 6 are repeated until the cavity A between the outer semi-rigid sheets 4 and 5 is filled or slightly overflowing. While the foam sandwich panel thus fabricated is curing, which takes approximately 7 minutes, a hand router or comparable tool is utilized to route the open edge of the panel to the standard dimensions desired. Scrap foam resulting from this trimming operation may be picked up by a vacuum hose and deposited in a suitable container to be sold as loose insulation.

When the foam has cured, the snap-over clamps 7 are released to permit withdrawing the press outer member 2 on the rails 9 and removal of the completed panel with the hinged intermediate member 3 still in place. However, the previously waxed hinged intermediate member 3 is readily removed by manually grasping the upper ends of the vertical side members 24 and 25, FIG. 5, and pulling them outwardly to the horizontal position, thereby completing the fabrication process to provide the finished product illustrated in FIG. 7.

Referring to FIG. 7, it will be observed that the foam layer 33 between the outer semi-rigid sheets 4 and 5 terminates short of the left end of the semi-rigid sheets to provide the open area 26 previously noted. This is merely an exemplary configuration, and as those skilled in the building arts will appreciate, the purpose of the open area 26 is to accommodate frame members of the building. By providing hinged intermediate members 3 of varying dimensions, panels in all standard configurations may be readily fabricated.

We claim:

1. A method for fabricating a foam sandwich panel comprising the steps of:
    a. placing a first sheet of material, which sheet comprises one outer layer of the completed panel, in an upright position against the inner surface of a press outer stationary member;
    b. placing a second sheet of material, which sheet comprises a second outer layer of the completed panel, in an upright position against the inner surface of a press outer movable member;
    c. positioning a temporary and releaseable bottom and side closure member against one of said sheets;
    d. moving said movable press member toward said stationary press member until said first and said second sheets are juxtaposed in contact with said closure member and spaced apart by said closure member;
    e. securing said movable press member to said stationary press member;
    f. injecting a stream of foamable polyurethane reaction mixture in a horizontal pass into the open space between the tops of said sheets; and
    g. repeating said injecting step at timed intervals until the space between said sheets is filled with the foamed polyurethane from said reaction mixture, said timed interval being equal to or greater than the rising time of said reaction mixture.

* * * * *